United States Patent [19]

Hufendiek

[11] 4,036,340

[45] July 19, 1977

[54] COMMERCIAL VEHICLE DRIVEN BY AN INJECTION INTERNAL COMBUSTION ENGINE HAVING A TRANSMISSION WITH HYDRODYNAMIC COUPLING OR WITH A HYDRODYNAMIC TORQUE CONVERTER

[75] Inventor: Ernst-Wilhelm Hufendiek, Stuttgart, Germany

[73] Assignee: Daimler-Benz Aktiengesellschaft, Germany

[21] Appl. No.: 679,685

[22] Filed: Apr. 23, 1976

[30] Foreign Application Priority Data

Apr. 24, 1975 Germany .............................. 2518119

[51] Int. Cl.$^2$ .......................... F02D 9/06; B60K 41/16
[52] U.S. Cl. .................................. 192/.084; 123/97 B; 123/107; 188/273; 192/.033
[58] Field of Search .............. 123/97 B, 107; 188/273; 192/.033, .046, .084

[56] References Cited

U.S. PATENT DOCUMENTS

| | | | |
|---|---|---|---|
| 2,868,182 | 1/1959 | Cornelius | 192/.084 X |
| 3,486,595 | 12/1969 | Turner | 123/97 B X |

FOREIGN PATENT DOCUMENTS

2,322,852   5/1973   Germany .......................... 123/97 B

*Primary Examiner*—Robert G. Nilson
*Attorney, Agent, or Firm*—Craig & Antonelli

[57] ABSTRACT

A commercial vehicle driven by an injection internal combustion engine with a transmission including a hydrodynamic coupling or hydrodynamic torque converter having a by-pass clutch and with an engine brake actuatable by way of a switch; an adjusting mechanism which is operatively connected with the controller of the injection pump includes an actuating cylinder containing an actuating piston adapted to be acted upon by a pressure medium and controllable in dependence on the engine brake; means which are provided for influencing the adjusting mechanism during the operation of the internal combustion engine, are interconnected between the engine brake switch and the adjusting mechanism and, upon disengagement of the by-pass clutch shortly prior to reaching the idling rotational speed of the internal combustion engine, effect an automatic adjustment of the controller of the injection pump from the zero fuel feed position to the idling position.

10 Claims, 1 Drawing Figure

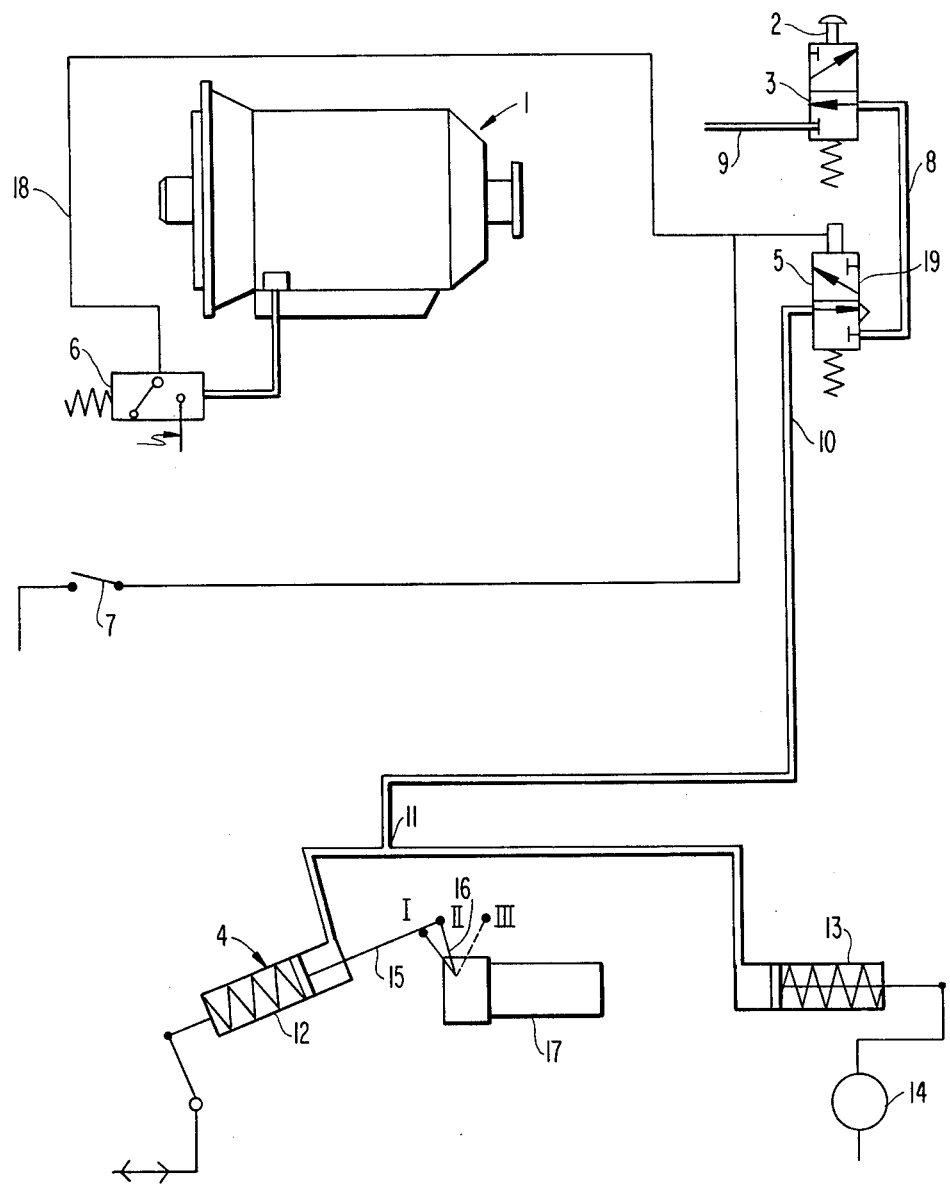

COMMERCIAL VEHICLE DRIVEN BY AN INJECTION INTERNAL COMBUSTION ENGINE HAVING A TRANSMISSION WITH HYDRODYNAMIC COUPLING OR WITH A HYDRODYNAMIC TORQUE CONVERTER

The present invention relates to a commercial-type vehicle driven by an injection combustion engine which includes a transmission with a hydrodynamic coupling or a hydrodynamic torque converter and with a by-pass clutch and an engine brake actuatable by a switch.

In order to avoid with such types of transmissions for trucks or buses, among which are also included the so-called semi-automatic transmissions, namely a combination of torque converter-shifting clutch and synchronized transmission, the slippage and output loss within certain drive ranges, a by-pass clutch is normally built into the same.

Since the torque converters or couplings transmit nearly no engine braking output in the pushing operation of the vehicle, the by-pass clutch is engaged up to shortly prior to reaching the idling rotational speed. Upon the disengagement of the clutch, the engine drops immediately to the rotational speed adjusted at the controller of the injection pump since the transmission cannot transmit the pushing torque to the engine.

With mechanical transmissions, the controller of the injection pump is displaced with an actuated engine brake to the stoppage position in order to increase the brake output of the engine, on the one hand, and in order not to inject unnecessarily the fuel, on the other.

The utilization of this advantage has not been possible heretofore in transmissions with a hydrodynamic coupling or hydrodynamic torque converter since with a disengaged by-pass clutch, the engine would be stopped in the driving operation—since no sufficient torque is transmitted to the engine—which would also lead automatically to the loss of auxiliary drives, such as, for example, the hydraulic servo-steering assist.

In order to avoid this disadvantage which does not lack danger, the controller of the injection pump was adjusted heretofore with such types of transmission to idling with an actuated engine brake. This measure, however, has as a consequence that the engine—as customary with mechanical transmissions—cannot be turned off by engagement of the engine brake.

It is the aim of the present invention to now eliminate in the simplest possible manner the aforementioned shortcomings.

The underlying problems are solved according to the present invention in that an adjusting mechanism which is connected with the regulator or controller of the injection pump and which essentially consists of an actuating cylinder adapted to be acted upon by a pressure medium and influenceable in dependence on the engine brake, is adapted to be influenced during the operation of the internal combustion engine by control means interconnected between the adjusting mechanism and the switch, which control means effect an automatic adjustment of the controller of the injection pump from the stoppage position (zero feed) into the idling position when the by-pass clutch—shortly prior to reaching the idling rotational speed of the internal combustion engine—is disengaged.

In an advantageous construction of the present invention, an electromagnetic three/two-way valve may be provided which after disengagement of the by-pass clutch vents the actuating cylinder of the adjusting mechanism which had previously been acted upon with the pressure medium.

In an preferred embodiment of the present invention, the venting installation may be arranged in the solenoid valve itself.

According to a further feature of the present invention, the solenoid valve may be adapted to be additionally influenced by an electric switch cooperating with the transmission shifting lever which in the neutral position of the transmission lever cancels out or lifts the interrupted connection from the switch to the actuating cylinder interrupted by the solenoid valve.

By the adoption of the measures in accordance with the present invention, the heretofore utilized engine auxiliary aggregates, such as the injection pump, the engine braking installation, the servo-steering assist, etc. remain preserved in their full extent, i.e., remain fully operable, without structural changes when commercial vehicles are used which are equipped with a transmission having a hydrodynamic coupling or a hydrodynamic torque converter, notwithstanding the use of an adjusting mechanism as described in the German Pat. No. 2,322,025. Shifting possibilities are thus created by the arrangement made in accordance with the present invention which are not inferior in the manner of operation to those in mechanical transmissions.

Accordingly, it is an object of the present invention to provide a commercial type of motor vehicle driven by an injection internal combustion engine which is equipped with a transmission including a hydrodynamic coupling or a hydrodynamic torque converter and a by-pass clutch and with an engine braking system, which obviates by simple means the aforementioned shortcomings and drawbacks encountered in the prior art.

Another object of the present invention resides in an engine braking system for commercial types of vehicles equipped with a transmission including a hydrodynamic coupling or torque converter, which permits use of a by-pass clutch for engine braking, yet avoids the loss of auxiliary aggregates such as the hydraulic steering assist, etc. when the by-pass clutch is disengaged during engine braking.

A further object of the present invention resides in a control system for an engine braking installation of commercial types of motor vehicles driven by injection internal combustion engines, in which the injection pump is automatically adjusted during engine braking from zero fuel feed position to an idling position when the by-pass clutch is disengaged as the internal combustion engine approaches the idling rotational speed.

A still further object of the present invention resides in an engine braking installation for commercial vehicles driven by injection internal combustion engines and equipped in their transmission with a hydrodynamic coupling or torque converter which avoids by simple means the aforementioned shortcomings and drawbacks encountered in the prior art, yet assures reliable operation without loss of auxiliary drive aggregates that might endanger the safety of the vehicle operation.

Still a further object of the present invention resides in a control system for engine braking installations of trucks or buses driven by injection internal combustion engines and equipped with a transmission including a hydrodynamic coupling or torque converter, which offers shifting possibilities that render such installation in no way inferior to those possible with purely mechanical transmissions.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic view of one embodiment of a control installation for a commercial vehicle driven by an injection internal combustion engine with a transmission including a hydrodynamic coupling or hydrodynamic torque converter and a by-pass clutch and equipped with an engine braking installation.

Referring now to the single FIGURE of the drawing, reference numeral 1 generally designates in this FIGURE a transmission provided with an automatically controlled by-pass clutch and a hydrodynamic coupling or hydrodynamic torque converter, which is provided for a commercial type vehicle such as a bus or truck equipped with an engine brake. A switch 2 constructed as foot switch is provided for the actuation of the engine brake and is operatively connected with a 3/2-way valve 3 of conventional construction which controls the supply of the pressure medium from pressure air supply line 9. Reference numeral 4 generally designates an adjusting mechanism for adjusting the injection pump 17 as will be described more fully hereinafter. An electromagnetic 3/2-way valve 5 is interconnected in the pressure line system 9, 8, 10 between the foot switch 2 connected to the 3/2-way valve 3 for the actuation of the engine brake and the adjusting mechanism 4. The 3/2-way valve 5 is adapted to be influenced by a pressure switch 6 actuatable by the by-pass clutch (not shown) as well as by an electric switch 7 cooperating with a transmission lever (not shown). The pressure switch 6 and the electric switch 7 thereby operate independently of one another. Closure of either switch 6 or 7 will energize the solenoid valve 5.

The 3/2-way valve 3 adjustable by the foot switch 2 and the 3/2-way solenoid valve 5 are shown in the drawing in the normal rest position, i.e., the connecting line 8 is not connected either with the compressed air supply line 9 leading from the pressure air reservoir or with the pressure air line 10. The latter branches off at a place 11 and leads, on the one hand, to an actuating cylinder 12 of the adjusting mechanism 4 and, on the other, to a working cylinder 13 which is mechanically connected with the exhaust valve 14.

The actuating cylinder 12 is pivotally connected with its linkage 15 at the controller or regulator 16 of the injection pump 17.

In the pushing operation of the commercial vehicle with actuation of the foot switch 2, the 3/2-way solenoid valve 5 will permit passage of the pressure medium (pressure air) to the individual cylinders 12 and 13 only if the by-pass clutch is engaged and therewith the pressure switch 6 is closed to thereby energize the solenoid valve 5, the pressure switch 6 being shown in the drawing in the open position corresponding to the disengaged condition of the by-pass clutch.

If, however, the engine rotational speed drops, for example, below 900 rotations per minute (the idling speed being at approximately 600 rotations per minute), then the by-pass clutch is automatically disengaged in a conventional manner whereby the pressure switch 6 is opened as a result of the disappearance of the clutch engaging hydraulic actuating pressure, the current flow in the electric energizing line 18 is interrupted and the solenoid valve 5 moves from its operating position, when energized, into the illustrated rest position, when de-energized, as a result of which the actuating cylinder 12 and the working cylinder 13 are vented by way of the vent device accommodated in the solenoid valve 5. The controller 16 of the injection pump 17 thus passes from the stoppage position I into the idling position II as a result of the displacement of the spring-loaded piston within the cylinder 12. The position III thereby indicates the full-load position of the controller 16 of the injection pump 17.

Consequently, an absolute stoppage of the engine in the pushing operation as well as a putting out of operation of the auxiliary aggregates driven by the engine, such as, the servo-steering system, the level regulation, etc. are precluded.

Since a stoppage of the engine is not possible in the idling operation notwithstanding an actuation of the engine brake due to the opening of the switch 6, the previous interruption of the energizing circuit, interrupted by the opening of the switch 6, is cancelled out by the electric switch 7 in the neutral position of the transmission lever, since switch 7, operatively connected with the transmission lever is closed in the neutral position of the transmission lever. As a result thereof, the solenoid valve 5 is returned to its working position when energized by closure of switch 7, whereby pressure air again acts upon by the actuating cylinder 12 which displaces the controller 16 from the position II to position I. As a result thereof, the engine is turned off when the transmission lever is in neutral.

However, the engine cannot be turned off when the transmission lever is in any driving range position, i.e., in any position in which a speed is engaged.

Thus, the controller 16 of the injection pump 17 can be displaced into the zero feed position I by the supply of pressure air to the actuating cylinder 12 only if the solenoid valve 5 is energized when the engine brake foot switch 2 is depressed and either switch 6 or switch 7 is closed, thereby connecting the compressed air feed line 9 with the connecting line 8 and with the line 10, whence the pistons in actuating cylinders 12 and 13 are displaced by the air pressure against their respective springs. Solenoid valve 5, however, is energized only as long as the by-pass clutch remains engaged (closure of switch 6) or as long as the transmission shifting lever is in the neutral position (closure of switch 7).

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A commercial vehicle driven by an injection internal combustion engine, which comprises a transmission including a hydrodynamic device and a by-pass clutch means, and an engine braking means actuatable by way of a switch means, said injection internal combustion engine including an injection pump and controller means for said injection pump having a stop position and an idling position, characterized by an adjusting means operatively connected with the controller means of the injection pump and including an actuating cylinder adapted to be acted upon by a pressure medium and influenceable in dependence on the engine braking means, and control means operatively connected between the adjusting means and the switch means for influencing said adjusting means during operation of the internal combustion engine, said control means being operable upon disengagement of the by-pass clutch means—shortly prior to reaching the idling rotational speed of the internal combustion engine—to effect an automatic adjustment of the controller means for the injection pump from the stop position to the idling position thereof.

2. A commercial vehicle according to claim 1, characterized in that said control means includes an electromagnetic valve means which upon disengagement of the by-pass clutch means vents the previously acted upon actuating cylinder of the adjusting means.

3. A commercial vehicle according to claim 2, characterized in that thhe electromagnetic valve means is an electromagnetic three/two-way valve.

4. A commercial vehicle according to claim 2, characterized in that venting means for venting the actuating cylinder are provided in the electromagnetic valve means.

5. A commercial vehicle according to claim 4, with a transmission lever provided for the speed selection, characterized in that the electromagnetic valve means is additionally controlled by an electric switch cooperating with the transmission lever, which in the neutral position of the transmission lever cancels out the interruption of the connection from the switch means to the actuating cylinder of the adjusting means which had been interrupted by the electromagnetic valve means.

6. A commercial vehicle according to claim 5, characterized in that the electromagnetic valve means is an electromagnetic three/two-way valve.

7. A commercial vehicle according to claim 1, with a transmission lever provided for the speed selection, characterized in that the electromagnetic valve means is additionally controlled by an electric switch cooperating with the transmission lever, which in the neutral position of the transmission lever cancels out interruption of the connection from the switch means to the actuating cylinder of the adjusting means which had been interrupted by the electromagnetic valve means.

8. An engine braking system for a commercial vehicle driven by an injection internal combustion engine including a fuel injection pump and controller means for the injection pump and equipped with a transmission including a hydrodynamic device and a by-pass clutch operable to by-pass said hydrodynamic device when engaged, said by-pass clutch being disengaged when the engine rotational speed drops below a predetermined rotational speed, characterized by an adjusting means for selectively adjusting the controller means between zero fuel feed position and idling speed position, switch means for actuating the engine brake, and control means operatively connected between said switch means and said adjusting means and operable to provide the admission of a pressure medium to said adjusting means to displace the controller means from the idling position to the zero fuel feed position as long as the by-pass clutch remains in the engaged condition.

9. An engine braking system according to claim 8, characterized in that said control means includes a solenoid valve means energized as long as the by-pass clutch is engaged, said solenoid valve means providing a connection for the pressure medium from a valve operatively connected with the switch means to the actuating cylinder of the adjusting means, said valve operatively connected with the switch means being operable to connect a pressure medium supply with said solenoid valve means.

10. An engine braking system according to claim 9, characterized in that a further switch is connected in parallel with a switch opened by disengagement of the by-pass clutch, said switches being connected in the energizing circuit of said solenoid valve means, said further switch being operatively connected with a transmission shifting lever and being closed with the transmission shifting lever in the neutral position.

* * * * *